(12) United States Patent
Kim et al.

(10) Patent No.: US 11,513,345 B2
(45) Date of Patent: Nov. 29, 2022

(54) APPARATUS AND METHOD FOR DESIGNING LIGHT GUIDE PLATE PATTERN

(71) Applicant: KORTEK CORPORATION, Incheon (KR)

(72) Inventors: Dong Kyu Kim, Seoul (KR); Seong Hwa Lee, Hwaseong-si (KR)

(73) Assignee: KORTEK CORPORATION, Incheon (KR)

( * ) Notice: Subject to any disclaimer, the term of this patent is extended or adjusted under 35 U.S.C. 154(b) by 932 days.

(21) Appl. No.: 16/332,375

(22) PCT Filed: Aug. 9, 2017

(86) PCT No.: PCT/KR2017/008638
§ 371 (c)(1),
(2) Date: Mar. 12, 2019

(87) PCT Pub. No.: WO2018/048107
PCT Pub. Date: Mar. 15, 2018

(65) Prior Publication Data
US 2019/0353896 A1    Nov. 21, 2019

(30) Foreign Application Priority Data

Sep. 12, 2016 (KR) .......................... 10-2016-0117628

(51) Int. Cl.
*G02B 27/00* (2006.01)
*G06T 7/70* (2017.01)
(Continued)

(52) U.S. Cl.
CPC ..... *G02B 27/0012* (2013.01); *G01M 11/0264* (2013.01); *G02F 1/1309* (2013.01);
(Continued)

(58) Field of Classification Search
CPC .. G02B 27/0012; G02B 6/004; G02B 6/0061; G06T 7/70; G01M 11/0264; G02F 1/1309
See application file for complete search history.

(56) References Cited

U.S. PATENT DOCUMENTS

2015/0269895 A1* 9/2015 Kao ..................... G09G 3/3426
345/690
2016/0334565 A1* 11/2016 Wang ................ G02F 1/133604

FOREIGN PATENT DOCUMENTS

JP      H08271893 A    10/1996
JP      2003167529 A    6/2003
(Continued)

OTHER PUBLICATIONS

PCT International Search Report corresponding to PCT/KR2017/008638 filed Aug. 9, 2017.

*Primary Examiner* — Afroza Chowdhury
(74) *Attorney, Agent, or Firm* — Schmeiser, Olsen & Watts, LLP

(57) ABSTRACT

Provided is a device and method for designing a light guide plate pattern, the device including a camera configured to capture a liquid crystal display device module mounted in a curved display device, a mura position detector configured to detect a position of mura on the basis of image information and luminance information captured by the camera, a mura shape detector configured to detect shape of the mura on the basis of the image information and the luminance information captured by the camera, a dot pattern density adjuster configured to adjust a density of dot patterns of a light guide plate based on a shape for removing the mura corresponding to the shape of the mura generated in the liquid crystal display device module.

12 Claims, 6 Drawing Sheets

(51) Int. Cl.
*G01M 11/02* (2006.01)
*G02F 1/13* (2006.01)
*F21V 8/00* (2006.01)

(52) U.S. Cl.
CPC ............... *G06T 7/70* (2017.01); *G02B 6/004* (2013.01); *G02B 6/0061* (2013.01)

(56) References Cited

FOREIGN PATENT DOCUMENTS

| | | | |
|---|---|---|---|
| KR | 20020033718 | A | 5/2002 |
| KR | 100493141 | B1 | 5/2005 |
| KR | 20140133882 | A | 11/2014 |
| KR | 20160027330 | A | 3/2016 |

\* cited by examiner

APPARATUS AND METHOD FOR DESIGNING LIGHT GUIDE PLATE PATTERN

CROSS-REFERENCE TO RELATED APPLICATIONS

This application claims priority to PCT Application No. PCT/KR2017/008638, having a filing date of Aug. 9, 2017, based on KR 10-2016-0117628, having a filing date of Sep. 12, 2016, the entire contents both of which are hereby incorporated by reference.

FIELD OF TECHNOLOGY

The following relates to a device and method for designing a light guide plate pattern, and more particularly, to a device and method for designing a light guide plate pattern capable of improving cell mura by designing a density of dots of a light guide plate (LGP) on the basis of a shape of a cell mura generation area measured by a liquid crystal display device module (LCM).

BACKGROUND

Generally, since performance of a backlight in a liquid crystal display device module (LCM) mostly depends on performance of a light guide plate (LGP), design of the LGP is a very important issue in manufacturers of the LCM (backlight unit (BLU), LCD module).

Therefore, various research and development studies for further improving performance of the LGP even slightly have been carried out.

However, the design of the LGP, which has been conventionally performed, is mostly for application to a flat panel type display device. Although cell mura does not occur when the design of the LGP is applied to the flat panel type display device (see FIG. 1(a)), there are problems in that uniform illumination is not implemented and cell mura or cell dark mura occurs when the design of the LGP is applied to a curved display device without change (see FIG. 1(b)).

FIG. 1 is an exemplary view for describing a reason why cell mura occurs when a flat panel type display device and a curved display device are implemented using the LCM conventionally.

For example, although a conventional curved display device has been implemented using an organic light emitting diode (OLED) panel, when such a curved display device is implemented using the LCM (BLU, LCD module), there is a problem in that cell mura or cell dark mura occurs due to cell stress which occurs in a curved area having a large curvature.

Therefore, there is a need for an LGP capable of improving cell mura which occurs when a curved display device is implemented using the LCM.

The known art of the present invention has been disclosed in Korean Patent Publication No. 2002-0033718 (Date of publication: May 7, 2002, Title: Method of designing light guide plate pattern).

SUMMARY

An aspect relates to a device and method for designing a light guide plate pattern capable of improving cell mura by designing a density of dots of a light guide plate (LGP) on the basis of a shape of a cell mura generation area measured by a liquid crystal display device module (LCM).

A device for designing a light guide plate pattern according to an aspect of embodiments of the present invention includes a camera configured to capture a liquid crystal display device module mounted in a curved display device, a mura position detector configured to detect a position of mura on the basis of image information and luminance information captured by the camera, a mura shape detector configured to detect shape of the mura on the basis of the image information and the luminance information captured by the camera, a dot pattern density adjuster configured to adjust a density of dot patterns of a light guide plate based on a shape for removing the mura corresponding to the shape of the mura generated in the liquid crystal display device module, and an overall dot pattern generator configured to, when a dot pattern density is adjusted to a predesignated shape at a position at which the mura generated in the liquid crystal display device module is removable during manufacture of the curved display device, generate an overall dot pattern of a light guide plate to which the adjusted dot pattern density is applied.

The camera may include a sensor for image capturing and a sensor for luminance detection.

The device may further include a mura position compensator configured to compensate for a difference between a position of mura in the captured image and an actual position of mura generated in the liquid crystal display device module.

The mura position compensator may virtually generate a quadrangular image only formed of straight lines without any curve on four sides by reflecting curvature information of the curved display device to the captured image and reflect a compensation value applied for generating the virtual quadrangular image to a position value of mura detected from the image to calculate a compensated mura position in the virtual quadrangular image.

The mura shape detector may approximate boundaries of dot areas which irregularly appear in the vicinity of a boundary of the mura by applying a spline smoothing technique to the detected shape of the mura to specify an overall shape of the mura.

The device may further include a mura shape compensator configured to compensate for a difference between the shape of the mura in the captured image and an actual shape of mura generated in the liquid crystal display device module.

The mura shape compensator may virtually generate a quadrangular image only formed of straight lines without any curve on four sides by reflecting curvature information of the curved display device to the captured image and reflect a compensation value applied for generating the virtual quadrangular image to a shape of mura detected from the image to calculate a compensated mura shape in the virtual quadrangular image.

The dot pattern density adjuster may further increase the dot pattern density than an average surrounding density using a shape that follows the shape of the mura or further increase the dot pattern density than the average surrounding density using a polygonal, circular, or elliptical shape which covers the entire shape of the mura.

The dot pattern density adjuster may adjust the dot pattern density by referring to a graph of luminance or light quantity according to a preset density or a lookup table.

A method for designing a light guide plate pattern according to another aspect of embodiments of the present invention includes a step of capturing, by a camera, a liquid crystal display device module mounted in a curved display device, a step of detecting, by a controller, a position of mura and a shape of the mura on the basis of image information and luminance information captured by the camera, a step of adjusting, by the controller, a density of dot patterns of a light guide plate based on a shape for removing the mura corresponding to the shape of the mura generated in the liquid crystal display device module, and a step of generating, by the controller, when a dot pattern density is adjusted to a predesignated shape at a position at which the mura generated in the liquid crystal display device module is removable during manufacture of the curved display device, an overall dot pattern of a light guide plate to which the adjusted dot pattern density is applied.

The method may further include, after the step of the detecting of the position of the mura and the shape of the mura, a mura position compensation step of compensating for, by the controller, a difference between a position of mura in the captured image and an actual position of mura generated in the liquid crystal display device module, and a mura shape compensation step of compensating for, by the controller, a difference between the shape of the mura in the captured image and an actual shape of mura generated in the liquid crystal display device module.

In the mura position compensation step, the controller may virtually generate a quadrangular image only formed of straight lines without any curve on four sides by reflecting curvature information of the curved display device to the captured image and reflect a compensation value applied for generating the virtual quadrangular image to a position value of mura detected from the image to calculate a compensated mura position in the virtual quadrangular image.

In the step of detecting the shape of the mura, the controller may approximate boundaries of dot areas which irregularly appear in the vicinity of a boundary of the mura by applying a spline smoothing technique to the detected shape of the mura to specify an overall shape of the mura.

In the mura shape compensation step, the controller may virtually generate a quadrangular image only formed of straight lines without any curve on four sides by reflecting curvature information of the curved display device to the captured image and reflect a compensation value applied for generating the virtual quadrangular image to a shape of mura detected from the image to calculate a compensated mura shape in the virtual quadrangular image.

In the step of adjusting the dot pattern density of the light guide plate, the controller may further increase the dot pattern density than an average surrounding density using a shape that follows the shape of the mura or further increase the dot pattern density than the average surrounding density using a polygonal, circular, or elliptical shape which covers the entire shape of the mura.

According to an aspect of embodiments of the present invention, cell mura can be improved by designing a density of dots of a light guide plate (LGP) on the basis of a shape of a cell mura generation area measured by a liquid crystal display device module (LCM).

BRIEF DESCRIPTION

Some of the embodiments will be described in detail, with reference to the following figures, wherein like designations denote like members, wherein.

DETAILED DESCRIPTION

Figure 1:
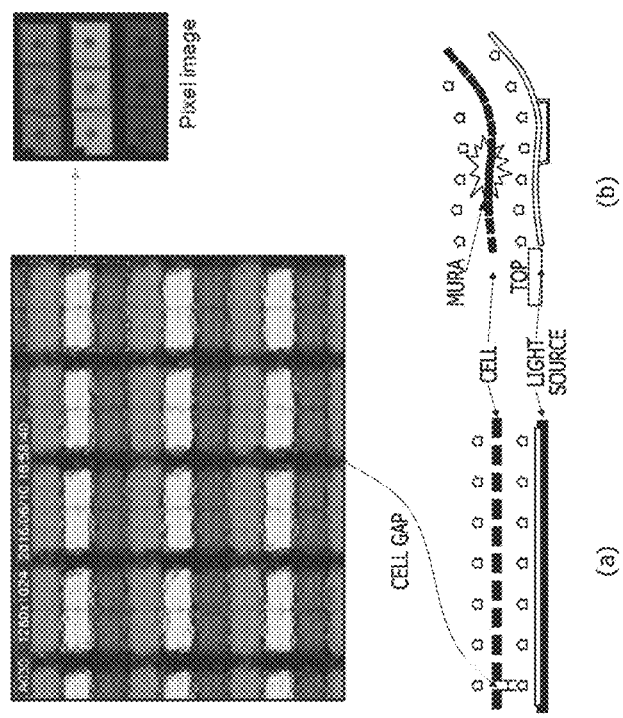
FIG. 1(a) is an exemplary view for describing a reason why cell mura occurs when a flat panel type display device and a curved display device are implemented using a liquid crystal display device module (LCM) conventionally.
FIG. 1(b) is an exemplary view for describing a reason why cell mura occurs when a flat panel type display device and a curved display device are implemented using a liquid crystal display device module (LCM) conventionally.

Hereinafter, an embodiment of a method of a device and method for designing a light guide plate pattern according to embodiments of the present invention will be described with reference to the accompanying drawings.

In this process, thicknesses of lines, sizes of elements, or the like illustrated in the drawings may have been exaggerated for clarity and convenience of description. Terms which will be described below are terms defined in consideration of functions in embodiments of the present invention and may vary according to intensions or practices of a user or an operator. Therefore, such terms should be defined on the basis of content throughout the present specification.

Figure 2:
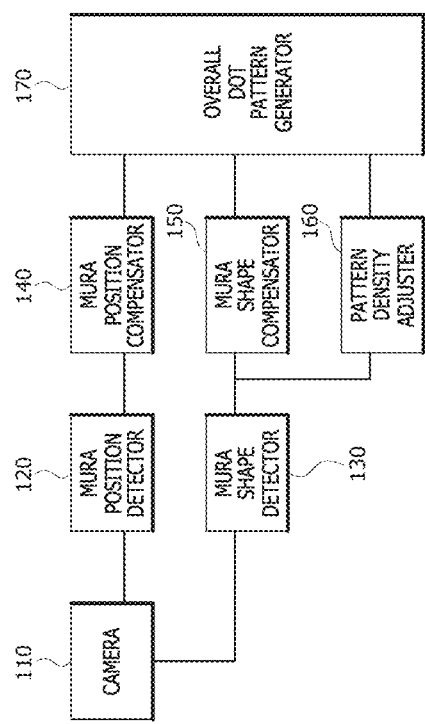
FIG. 2 is an exemplary view illustrating a schematic configuration of a device for designing a light guide plate pattern according to an embodiment of the present invention.

FIG. 2 is an exemplary view illustrating a schematic configuration of a device for designing a light guide plate pattern according to an embodiment of the present invention.

As illustrated in FIG. 2, the device for designing a light guide plate pattern includes a camera 110, a mura position detector 120, a mura shape detector 130, a mura position compensator 140, a mura shape compensator 150, a dot pattern density adjuster 160, and an overall dot pattern generator 170.

The camera 110 measures a degree of brightness output through a screen of a liquid crystal display device module (LCM). That is, the camera 110 measures a brightness of a unit area in which a backlight light source output through a light guide plate is output through a liquid crystal display (LCD) panel at a front surface.

Here, the LCM for measuring the degree of brightness is for application to a curved display device and has a curved panel. The light guide plate is assumed as a light guide plate, on which dot patterns (or patterns) are uniformly arranged, which is bent and mounted inside the LCM.

In addition, the camera 110 may not only include a camera but may also include a luminance detection device such as a spectroscopic luminance meter or a color luminance meter. Therefore, the camera 110 may also be referred to as a luminance detector, and according to an embodiment, a separate luminance meter may be mounted instead of the camera 110.

The mura position detector 120 detects a position of mura on the basis of information captured by the camera 110 (for example, image information, luminance information, and the like).

Figure 4:
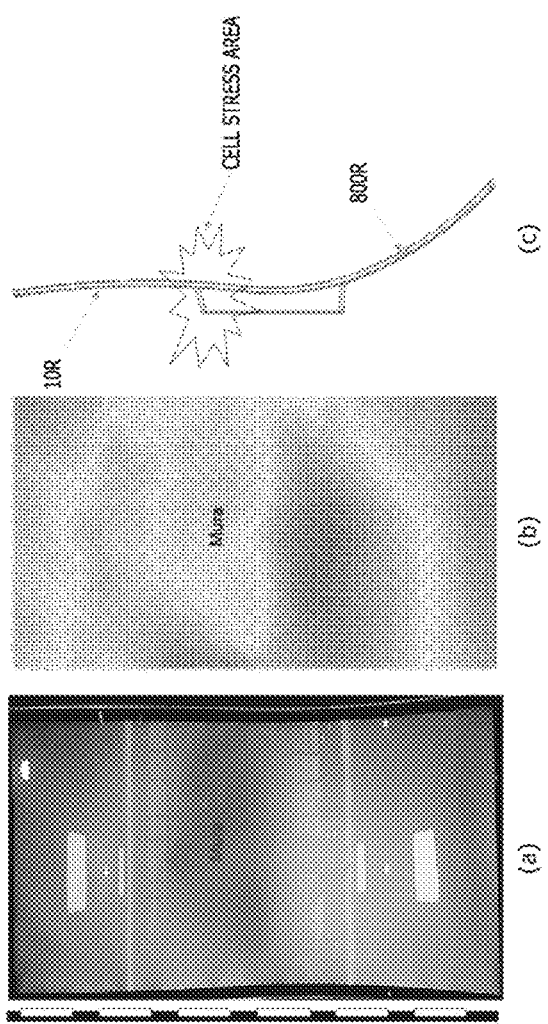
FIG. 4(a) is an exemplary view for describing that mura is generated due to cell stress when a curved display device is manufactured using the LCM according to an embodiment of the present invention.
FIG. 4(b) is an exemplary view for describing that mura is generated due to cell stress when a curved display device is manufactured using the LCM according to an embodiment of the present invention.
FIG. 4(c) is an exemplary view for describing that mura is generated due to cell stress when a curved display device is manufactured using the LCM according to an embodiment of the present invention.

In this case, since the LCM is applied to the curved display device, a front view image of the display device using the camera unit 110 is a quadrangular image having curvatures at both left and right sides instead of a completely quadrangular image (see FIG. 4(a)). Therefore, there is a difference between a position of mura detected from the quadrangular image having the curvatures and a position at which mura is actually generated in the LCM.

Accordingly, the mura position compensator 140 virtually generates a completely quadrangular image (that is, a quadrangular image formed of four linear sides without a curve) by reflecting the curvature information of the curved display device to the captured image and reflects a compensation value applied to generate the virtual quadrangular image to a position value of mura detected from the image to calculate and output a position of mura in the virtual quadrangular image.

The mura shape detector 130 detects a shape of mura on the basis of information (for example, image information, luminance information, and the like) captured by the camera 110 (see FIGS. 4(a) and 4(b)). Here, since an overall shape of the mura is formed by gathering of dot areas, it is, in fact, not easy to specify a boundary of the shape of the mura.

FIGS. 4(a) and (b) is an exemplary view for describing that mura is generated due to cell stress when the curved display device is manufactured using the LCM according to an embodiment of the present invention. FIG. 4(a) shows the shape of mura seen in an image captured from the front of the curved display device, FIG. 4(b) shows a shape of the mura in a color luminance image, and FIG. 4(c) is an exemplary cross-sectional view illustrating a position at which the mura is generated at a side surface of the curved display device.

Therefore, in the present embodiment, the mura shape detector 130 approximates boundaries of dot areas which irregularly appear in the vicinity of a boundary of the mura by applying a spline smoothing technique to the detected shape of the mura to specify an overall shape of the mura.

However, since, as described above, the LCM is applied to the curved display device, that is, since the front view image of the display device using the camera unit 110 is the quadrangular image having curvatures at both left and right sides instead of the completely quadrangular image, there is a difference between a shape of the mura detected from the quadrangular image having the curvatures and a shape of the mura actually generated in the LCM.

Therefore, after the shape of the mura is specified as described above, the mura shape compensator 150 calculates a more accurate shape of the mura.

Accordingly, as described above, the mura shape compensator 150 virtually generates a completely quadrangular image (that is, a quadrangular image only formed of straight lines without any curve on four sides) by reflecting curvature information of the curved display device to the captured image and reflects a compensation value applied for generating the virtual quadrangular image to a shape of mura detected from the image to calculate and output a shape of mura in the virtual quadrangular image.

The dot pattern density adjuster 160 adjusts a dot pattern density based on a shape for removing the mura corresponding to the shape of the mura generated in the curved display device.

Here, the dot pattern is a reflective dot pattern that causes irregular reflection to output light which is incident on an inner portion of the light guide plate (for example, light radiated from a backlight light source) to the outside of the light guide plate. For reference, methods of processing the dot pattern includes various processing methods such as a printing method, a cutting method, and an injection method.

Figure 5:
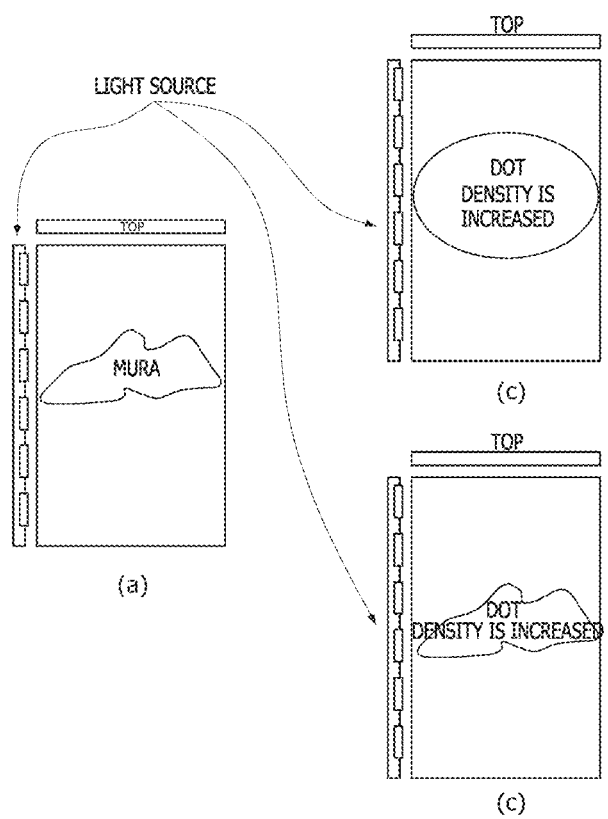
FIG. 5(a) is an exemplary view illustrating types of shapes for adjusting a dot pattern density according to an embodiment of the present invention.
FIG. 5(c) is an exemplary view illustrating types of shapes for adjusting a dot pattern density according to an embodiment of the present invention.

The dot pattern density adjuster 160 may adjust the dot pattern density (see FIG. 5(c)) using a shape that follows the shape of the mura (see FIG. 5(a)) or adjust the dot pattern density using a polygonal (for example, triangular, quadrangular, pentagonal, hexagonal, and the like) or circular (or elliptical) shape which covers the entire shape of the mura (see FIG. 5(b)).

FIGS. 5(a)-(c) is an exemplary view illustrating types of shapes for adjusting a dot pattern density according to an embodiment of the present invention.

For example, the dot pattern density adjuster 160 further increase the dot pattern density than an average surrounding density using a shape that follows the shape of the mura (see FIG. 5(c)) or further increase the dot pattern density than the average surrounding density using a polygonal or circular (or elliptical) shape which covers the entire shape of the mura (see FIG. 5(b)). Here, a dot pattern density used in the test becomes a reference for the adjusted dot pattern density.

Figure 6:
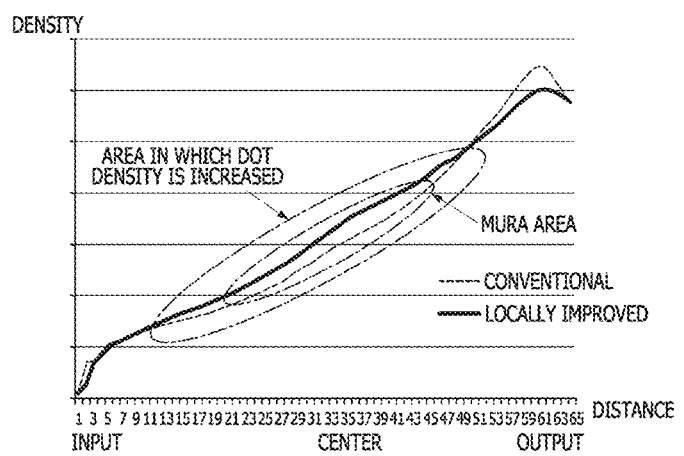
FIG. 6 is an exemplary view illustrating a graph of luminance according to a density which may be referred to when a dot density of a light guide plate is adjusted according to an embodiment of the present invention.

In this case, the dot pattern density adjusted by the dot pattern density adjuster 160 may be adjusted with reference to a graph of luminance (or light quantity) according to a preset density or a lookup table (see FIG. 6).

FIG. 6 is an exemplary view illustrating a graph of luminance according to a density which may be referred to when a dot density of a light guide plate is adjusted according to an embodiment of the present invention. As illustrated in FIG. 6, when a mura area is present at a specific position (distance), by increasing a dot density (that is, a density per unit area) of the light guide plate of the mura area, a luminance of a portion, which was the mura area, may be restored to be similar to a luminance (or light quantity) of the surroundings.

However, the graph illustrated in FIG. 6 is merely illustrative, and note that different forms of graphs may be applied in other embodiments.

Referring back to FIG. 2, the overall pattern shape generator 170 generates an overall dot pattern, to which the adjusted pattern density is applied, corresponding to the compensated shape of the mura at the compensated position of the mura. That is, the overall dot pattern is a dot pattern in which a dot density of a portion at which mura is generated due to cell stress is compensated when a flat light guide plate is bent along a curvature when the curved display device is manufactured.

Meanwhile, although not illustrated in detail in the drawings, among the elements 110 to 170 described above with reference to the present embodiment, a same function of the elements 120 to 170 other than the camera 110 may be integrally performed by a controller (not illustrated) (for example, a processor).

Hereinafter, a method for designing a light guide plate pattern using the controller (not illustrated) will be described with reference to FIG. 3.

Figure 3:
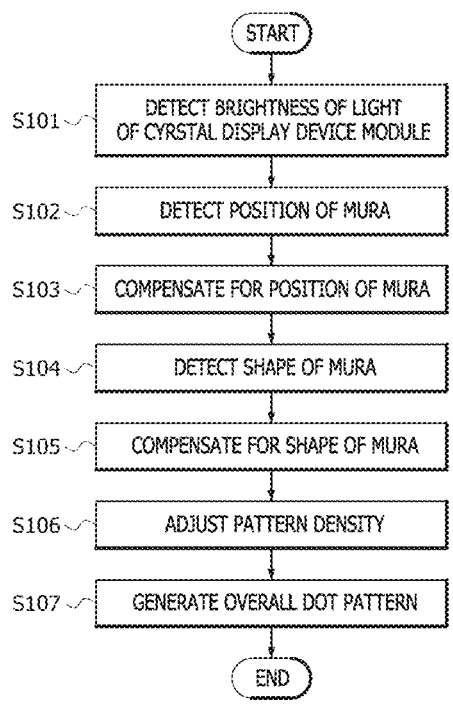
FIG. 3 is an exemplary view for describing a method for designing a light guide plate pattern according to an embodiment of the present invention.

FIG. 3 is an exemplary view for describing a method for designing the light guide plate pattern according to an embodiment of the present invention.

As illustrated in FIG. 3, the camera 110 measures a brightness output through a screen of the LCM (S101).

Here, the camera 110 performs a function of a luminance detector as well as an image capturing function. Therefore, the camera 110 may include a camera sensor and a luminance sensor.

The controller (not illustrated) performs a function of the mura position detector 120 to detect a position of the mura on the basis of information (for example, image information, luminance information, and the like) captured by the camera 110 (S102).

In this case, since a curvature is applied to the LCM, there is a difference between a position of the mura on the captured image and an actual position of the mura generated in the LCM. Therefore, the controller (not illustrated) compensates for the position of the mura (S103).

For example, the controller (not illustrated) virtually generates a completely quadrangular image (that is, a quadrangular image only formed of straight lines without any curve on four sides) by reflecting curvature information of the curved display device to the captured image and reflects a compensation value applied for generating the virtual quadrangular image to a position value of mura detected from the image to calculate a compensated position of the mura in the virtual quadrangular image.

In addition, the controller (not illustrated) detects a shape of the mura on the basis of the information (for example, image information, luminance information, and the like) captured by the camera 110 by performing the function of the mura shape detector 130 (see FIGS. 4(a) and 4(b)).

Here, since an overall shape of the mura is formed by gathering of dot areas, it is, in fact, not easy to specify a boundary of the shape of the mura. Therefore, the controller (not illustrated) approximates boundaries of dot areas which irregularly appear in the vicinity of a boundary of the mura by applying a spline smoothing technique to the detected shape of the mura to specify an overall shape of the mura.

In this case, since a curvature is applied to the LCM, there is a difference between a shape of mura in the captured image and the actual shape of the mura generated in the LCM. Therefore, the controller (not illustrated) compensates for the shape of the mura (S105).

For example, the controller (not illustrated) virtually generates a completely quadrangular image (that is, a quadrangular image only formed of straight lines without any curve on four sides) by reflecting curvature information of the curved display device to the captured image and reflects a compensation value applied for generating the virtual quadrangular image to a shape of mura detected from the image to calculate a shape of the mura in the virtual quadrangular image.

In addition, the controller (not illustrated) adjusts a dot pattern density using a shape for removing the mura corresponding to the shape of the mura generated in the curved display device by performing the function of the dot pattern density adjuster 160 (S106).

For example, the controller (not illustrated) further increases the dot pattern density than an average surrounding density using a shape that follows the shape of the mura (see FIG. 5(c)) or further increases the dot pattern density than the average surrounding density using a polygonal or circular (or elliptical) shape which covers the entire shape of the mura (see FIG. 5(b)).

Here, the controller (not illustrated) may adjust the dot pattern density with reference to a graph of luminance (or light quantity) according to a preset density or a lookup table (see FIG. 6).

As described above, during manufacture of the curved display device, when the dot pattern density capable of removing mura is adjusted by following a predesignated shape (for example, a polygonal, circular, or elliptical shape of mura), the controller (not illustrated) generates an overall dot pattern to which a dot pattern density adjusted using the preset shape is applied (S107).

When the overall dot pattern is generated as described above, generation of mura may be prevented when the curved display device is manufactured using the LCM including a light guide plate which is processed using the dot pattern.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements. The mention of a "unit" or a "module" does not preclude the use of more than one unit or module.

The invention claimed is:

1. A device for designing a light guide plate pattern, the device comprising:
   a camera configured to capture a liquid crystal display device module mounted in a curved display device;
   a mura position detector configured to detect a position of mura based on image information and luminance information captured by the camera;
   a mura shape detector configured to detect a shape of the mura based on the image information and the luminance information captured by the camera;
   a dot pattern density adjuster configured to adjust a density of dot patterns of a light guide plate based on a shape for removing the mura corresponding to the shape of the mura generated in the liquid crystal display device module;
   an overall dot pattern generator configured to, when a dot pattern density is adjusted to a predesignated shape at a position at which the mura generated in the liquid crystal display device module is removable during manufacture of the curved display device, generate an overall dot pattern of a light guide plate to which the adjusted dot pattern density is applied; and
   a mura position compensator configured to compensate for a difference between a position of the mura in the captured image and an actual position of the mura generated in the liquid crystal display device module,
   wherein the mura position compensator virtually generates a quadrangular image only formed of straight lines without any curve on four sides by reflecting curvature information of the curved display device to the captured image and reflects a compensation value applied for generating the virtual quadrangular image to a position value of the mura detected from the image to calculate a compensated mura position in the virtual quadrangular image.

2. The device of claim 1, wherein the camera includes a sensor for image capturing and a sensor for luminance detection.

3. The device of claim 1, wherein the mura shape detector approximates boundaries of dot areas which irregularly appear in the vicinity of a boundary of the mura by applying a spline smoothing technique to the detected shape of the mura to specify an overall shape of the mura.

4. The device of claim 1, further comprising a mura shape compensator configured to compensate for a difference between the shape of the mura in the captured image and an actual shape of mura generated in the liquid crystal display device module.

5. The device of claim 4, wherein the mura shape compensator virtually generates a quadrangular image only formed of straight lines without any curve on four sides by reflecting curvature information of the curved display device to the captured image and reflects a compensation value applied for generating the virtual quadrangular image to a shape of mura detected from the image to calculate a compensated mura shape in the virtual quadrangular image.

6. The device of claim 1, wherein the dot pattern density adjuster further increases the dot pattern density than an average surrounding density based on a shape that follows the shape of the mura, or further increases the dot pattern density than the average surrounding density using a polygonal, circular, or elliptical shape which covers the entire shape of the mura.

7. The device of claim 6, wherein the dot pattern density adjuster adjusts the dot pattern density by referring to a graph of luminance or light quantity according to a preset density or a lookup table.

8. A method for designing a light guide plate pattern, the method comprising:

capturing, by a camera, a liquid crystal display device module mounted in a curved display device;

detecting, by a controller, a position of mura and a shape of the mura based on image information and luminance information captured by the camera;

adjusting, by the controller, a density of dot patterns of a light guide plate based on a shape for removing the mura corresponding to the shape of the mura generated in the liquid crystal display device module;

generating, by the controller, when a dot pattern density is adjusted to a predesignated shape at a position at which the mura generated in the liquid crystal display device module is removable during manufacture of the curved display device, an overall dot pattern of a light guide plate to which the adjusted dot pattern density is applied; and after detecting the position of the mura and the shape of the mura, a mura position compensation step of compensating for, by the controller, a difference between the position of the mura in the captured image and an actual position of the mura generated in the liquid crystal display device module, wherein, in the mura position compensation step, the controller virtually generates a quadrangular image only formed of straight lines without any curve on four sides by reflecting curvature information of the curved display device to the captured image and reflects a compensation value applied for generating the virtual quadrangular image to a position value of mura detected from the image to calculate a compensated mura position in the virtual quadrangular image.

9. The method of claim 8, further comprising, after detecting the position of the mura and the shape of the mura:

compensating for, by the controller, a difference between the position of the mura in the captured image and an actual position of the mura generated in the liquid crystal display device module; and compensating for, by the controller, a difference between the shape of the mura in the captured image and an actual shape of the mura generated in the liquid crystal display device module.

10. The method of claim 9, wherein, in the step of detecting the shape of the mura, the controller approximates boundaries of dot areas which irregularly appear in the vicinity of a boundary of the mura by applying a spline smoothing technique to the detected shape of the mura to specify an overall shape of the mura.

11. The method of claim 9, wherein, in the mura shape compensation step, the controller virtually generates a quadrangular image only formed of straight lines without any curve on four sides by reflecting curvature information of the curved display device to the captured image and reflects a compensation value applied for generating the virtual quadrangular image to a shape of mura detected from the image to calculate a compensated mura shape in the virtual quadrangular image.

12. The method of claim 8, wherein, in the step of adjusting the dot pattern density of the light guide plate, the controller further increases the dot pattern density than an average surrounding density based on a shape that follows the shape of the mura, or further increases the dot pattern density than the average surrounding density based on a polygonal, circular, or elliptical shape which covers the entire shape of the mura.

\* \* \* \* \*